United States Patent
Byerley

(10) Patent No.: US 8,684,058 B2
(45) Date of Patent: Apr. 1, 2014

(54) ROLLER ASSEMBLY FOR USE DURING TIRE CONSTRUCTION

(75) Inventor: Mark S. Byerley, Greenback, TN (US)

(73) Assignee: BPS Engineering, LLC, Greenback, TN (US)

(*) Notice: Subject to any disclaimer, the term of this patent is extended or adjusted under 35 U.S.C. 154(b) by 506 days.

(21) Appl. No.: 12/804,520

(22) Filed: Jul. 23, 2010

(65) Prior Publication Data

US 2011/0024053 A1 Feb. 3, 2011

Related U.S. Application Data

(60) Provisional application No. 61/271,896, filed on Jul. 28, 2009.

(51) Int. Cl.
*B29D 30/28* (2006.01)
*F16C 13/00* (2006.01)

(52) U.S. Cl.
USPC .......................... 156/421; 156/130.3; 492/40

(58) Field of Classification Search
USPC ............. 156/96, 128.1, 130.3, 408, 412, 413, 156/421, 421.6; 492/39, 40, 47, 16; 193/35 TE
See application file for complete search history.

(56) References Cited

U.S. PATENT DOCUMENTS

| | | | | |
|---|---|---|---|---|
| RE13,127 E | * | 7/1910 | Perkins | 492/40 |
| 3,929,391 A | * | 12/1975 | Pico | 384/546 |
| 4,006,770 A | * | 2/1977 | Ferguson | 160/263 |
| 4,102,384 A | * | 7/1978 | Gossling et al. | 160/263 |
| 5,378,219 A | * | 1/1995 | Hart et al. | 492/48 |
| 5,967,450 A | * | 10/1999 | May et al. | 242/547 |
| 6,431,540 B1 | * | 8/2002 | Lien et al. | 271/109 |
| 7,270,230 B2 | * | 9/2007 | Smith | 198/604 |
| 2005/0282692 A1 | * | 12/2005 | Redden | 492/40 |

* cited by examiner

*Primary Examiner* — Martin Rogers
(74) *Attorney, Agent, or Firm* — Michael E. McKee

(57) ABSTRACT

A roller assembly for use during tire construction includes a telescoping tube arrangement and a roller positioned thereabout. The telescoping tube arrangement has an inner tube section and an outer tube section and which can be adjusted in length to accommodate the width of the tire component under construction. The roller includes a cylindrical surface of a desired hardness which is positionable into engagement with the outer surface of the tire component under construction and which includes a plurality of roller sections which are positionable about the telescoping tube arrangement and in a side-by-side relationship with one another. In addition, each roller section defines a peripheral surface so that when the roller sections are positioned in a side-by-side relationship along the tube arrangement, the peripheral surfaces of the roller sections collectively provide the cylindrical surface of the roller.

20 Claims, 7 Drawing Sheets

ROLLER ASSEMBLY FOR USE DURING TIRE CONSTRUCTION

The benefit of Provisional Application Ser. No. 61/271,896, filed. Jul. 28, 2009 and entitled ROLLER ASSEMBLY FOR USE DURING TIRE CONSTRUCTION, is hereby claimed. The disclosure of this referenced provisional patent application is incorporated herein by reference.

BACKGROUND OF THE INVENTION

This invention relates generally to the construction of vehicle tires and relates, more particularly, to the means and methods for consolidating a tire carcass and for marrying components of a tire during a tire construction process.

During construction of vehicle tires, a tire carcass is built upon a first stage tire-building drum as the drum is rotated about its longitudinal axis, and a roller having a cylindrical surface is subsequently used to consolidate the tire carcass as the cylindrical surface of the roller is pressed against the outer peripheral surface of the tire carcass. The consolidated carcass is thereafter transferred to a second stage (i.e. a rotatable shaping drum) where it awaits the positioning thereon of a belt and tread package of the vehicle tire.

The belt and tread package is constructed on a separate drum, and upon its completion, is transferred to the second stage drum upon which the carcass has already been positioned. During this transfer, the carcass is held upon the second stage drum while the belt and tread package is positioned onto the outer surface of the carcass. Thereafter, the belt and tread package is married to the carcass to form a green tire layup as a roller having a cylindrical surface is pressed against the outer peripheral surface of the tire layup.

In each of the aforedescribed instances in which a roller is used, the roller is supported adjacent the outer surface of the tire component to be engaged by the cylindrical surface of the roller for rotation about an axis which is substantially parallel to the axis of rotation of the tire component. With the roller supported in such a manner and its cylindrical surface in contact with the surface of the tire component, the rotation of the tire component about its rotation axis effects the rotation of the roller along its longitudinal axis. In other words, the roller is not normally rotated about its axis by any means other than through the frictional engagement between the cylindrical surface of the roller and the peripheral surface of the tire carcass or tire layup. At these stages of the tire-building process (i.e. before the green tire layup is cured), the materials comprising the carcass and the belt and tread package are relatively soft and tacky so that the contact between the roller and the outer surface of the belt and tread drum promotes a consolidation or bonding of the materials in the carcass and green tire layup.

Heretofore, a roller used for consolidating a tire carcass and for marrying the belt and tread package to the carcass during a tire construction process has included a hollow piece of foam material which is positioned along a shaft which, in turn, extends along the outer surface of the corresponding tire component desired to be engaged by the cylindrical surface of the roller. The cylindrical surface of the piece of foam material is relatively stiff, and the length of the piece of foam material has commonly been selected (and cut from a length of stock foam material) to correspond with the overall width of the tire carcass or the width of the belt and tread package positioned upon the carcass The foam piece of material commonly utilized for the roller has been known to be susceptible to wear, is relatively costly, and the stiffness of its surface is incapable of being changed if, for example, a greater or lesser stiffness of the roller would be preferable when pressed against the outer surface of the corresponding tire component. It would be desirable to provide an alternative apparatus which replaces the foam roller of the prior art and whose construction facilitates a prompt adjustment in the length of the roller to correspond to the width of the tire component to be engaged by the roller surface, possesses a greater resistance to wear than does the piece of foam material of the prior art, and accommodates a prompt change-out of roller components to provide the cylindrical surface of the roller with a greater or lesser degree of stiffness.

Accordingly, it is an object of the present invention to provide a new and improved roller assembly having a roller for use in tire construction and which is particularly well-suited for consolidating a tire carcass or for marrying the belt and tread package and a tire carcass to one another.

Another object of the present invention is to provide such an assembly which does not involve a cut-to-length piece of foam material such as that utilized by the prior art.

Still another object of the present invention is to provide such an assembly whose roller length can be easily altered to permit use of the roller on tire carcasses or green tire layups of differing widths.

Yet another object of the present invention is to provide such an assembly which employs a number of roller-providing components which collectively provide the length of the roller and which can be added to or removed from in order to alter the length of the roller.

A further object of the present invention is to provide such an assembly which accommodates a prompt change-out of the roller components for altering the degree of stiffness along the entirety of the peripheral surface of the roller or for providing selected regions of the roller surface with a stiffness which is different from that of other regions of the roller surface.

A still further object of the present invention is to provide such a roller assembly which is uncomplicated in structure, yet effective in operation.

SUMMARY OF THE INVENTION

This invention resides in a roller assembly for use during tire construction and which is positionable about a shaft which is supported along the width of a tire component under construction.

The roller assembly includes a telescoping tube arrangement having an inner tube section and an outer tube section and which arrangement can be adjusted in length to accommodate the width of the tire component under construction. In addition, the assembly includes a roller having a cylindrical surface which is positionable into engagement with the outer surface of the tire component under construction and which includes a plurality of roller sections which are positionable about the telescoping tube arrangement and in a side-by-side relationship with one another. Furthermore, each roller section defines a peripheral surface so that when the roller sections are positioned in a side-by-side relationship along the tube arrangement, the peripheral surfaces of the roller sections collectively provide the cylindrical surface of the roller.

DETAILED DESCRIPTION OF AN ILLUSTRATIVE EMBODIMENT

Figure 1:
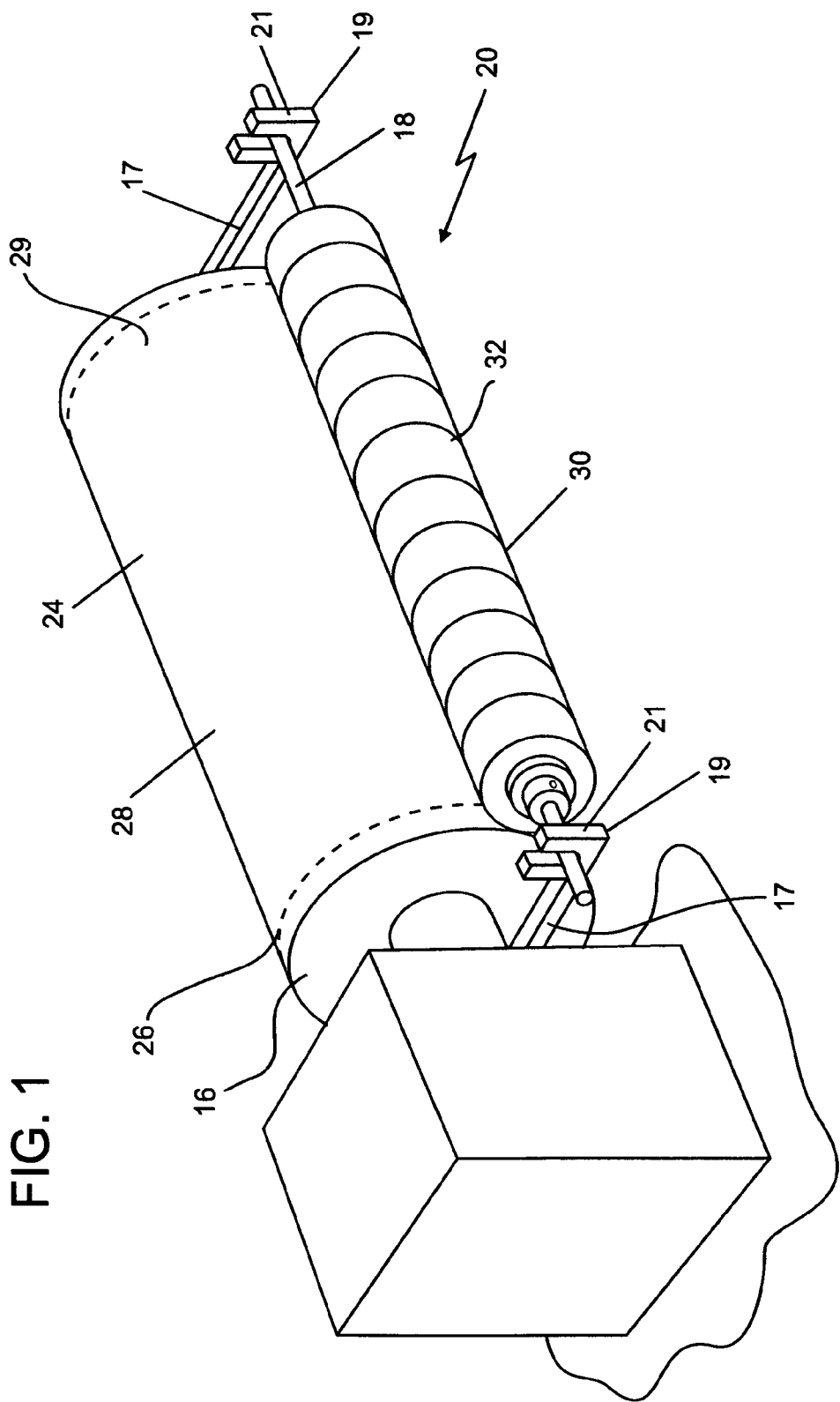
FIG. 1 is a schematic perspective view of a roller assembly which embodies features of the present invention and a tire-building machine with which the roller assembly is being utilized.

Turning now to the drawings in greater detail and considering first FIG. 1, there is illustrated an embodiment, generally indicated 20, of a roller assembly within which features of the present invention are embodied and a tire-building machine 16 with which the roller assembly 20 is used. In the depicted FIG. 1 view, the tire-building machine 16 is a second stage drum to which a formed tire carcass 26 has been transferred and which has been overlaid by a belt and tread package 28 to form a green tire layup 24. The roller assembly 20 is positioned against the outer peripheral surface, indicated 29, of the green tire layup 24 for purposes of marrying the belt and tread package 28 to the tire carcass 26. At this depicted stage (i.e. a pre-curing stage) of a tire building process, the materials which comprise the carcass 26 and the belt and tread package 28 are relatively soft and tacky. Consequently, as the roller assembly 20 contacts and rollably engages the outer peripheral surface 29 of the belt and tread package 28, the materials of the package 28 and the carcass 26 are bonded to together into a unitary structure.

For purposes of supporting the roller assembly 20 adjacent the outer peripheral surface 29 of the green tire layup 24, the tire-building drum 16 includes a pair of support arms 17 which are arranged at opposite ends of the layup 24 and are adapted to support a shaft 18 which extends between the arms 17. In this connection, the support arms 17 are pivotally attached to the remainder of the machine 16 to accommodate an upward or downward movement of the free end, indicated 19, of each arm 17, and each free end 19 of the arms 17 includes a bifurcated, or U-shaped, portion 21 for accepting a corresponding end of the shaft 18 positioned therein. As will be apparent herein, the roller assembly 20 is positioned about the shaft 18 which is, in turn, supported by the arms 17 so that by pivoting the free end 19 of the arms 18 upwardly or downwardly in a manner which is well known in the art, the surface (i.e. the cylindrical surface) of the roller assembly 20 is moved into working engagement (i.e. contact) with the outer surface of the green tire layup 24.

Figure 2:
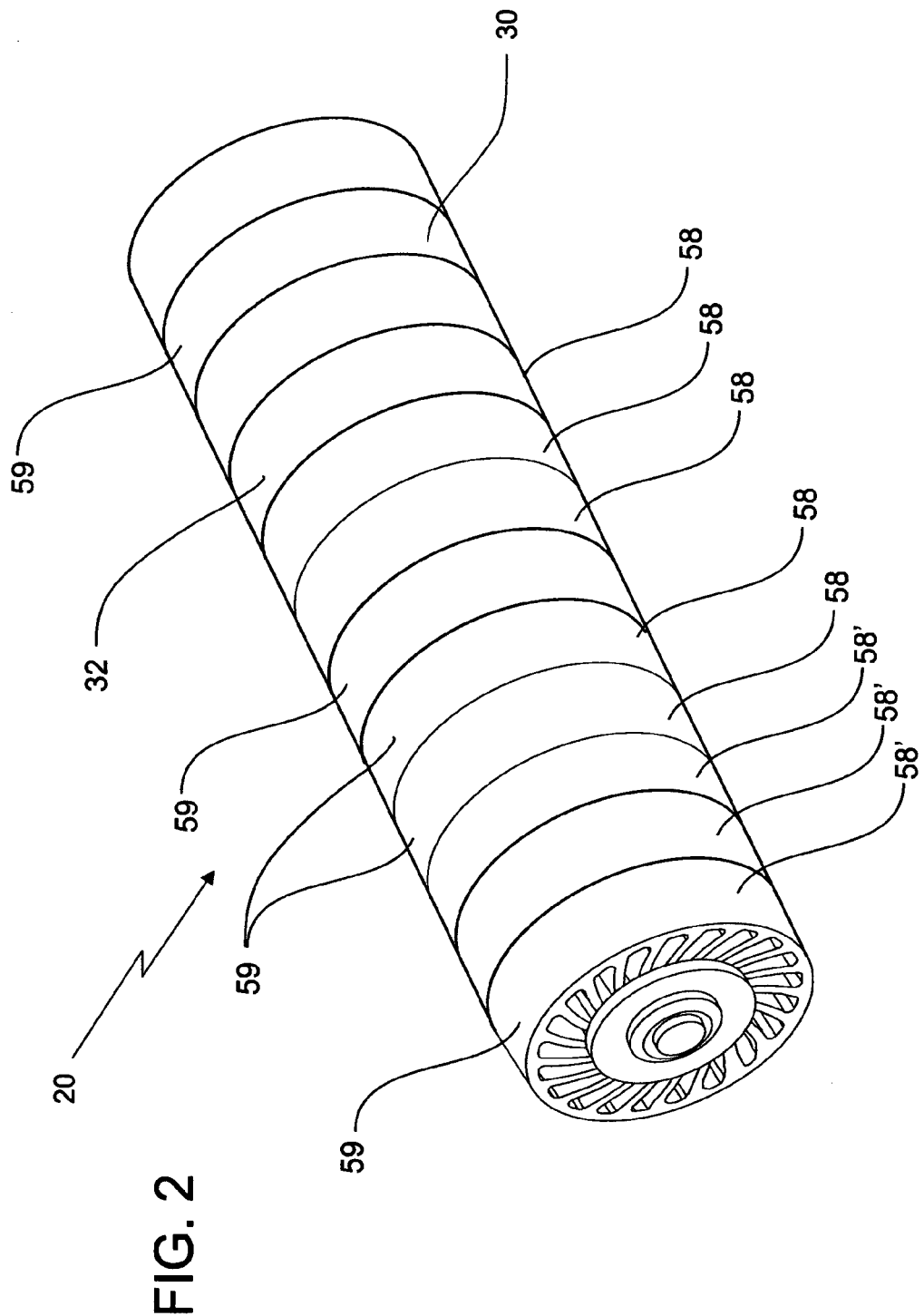
FIG. 2 is a perspective view of the roller assembly of the FIG. 1 view.
Figure 3:
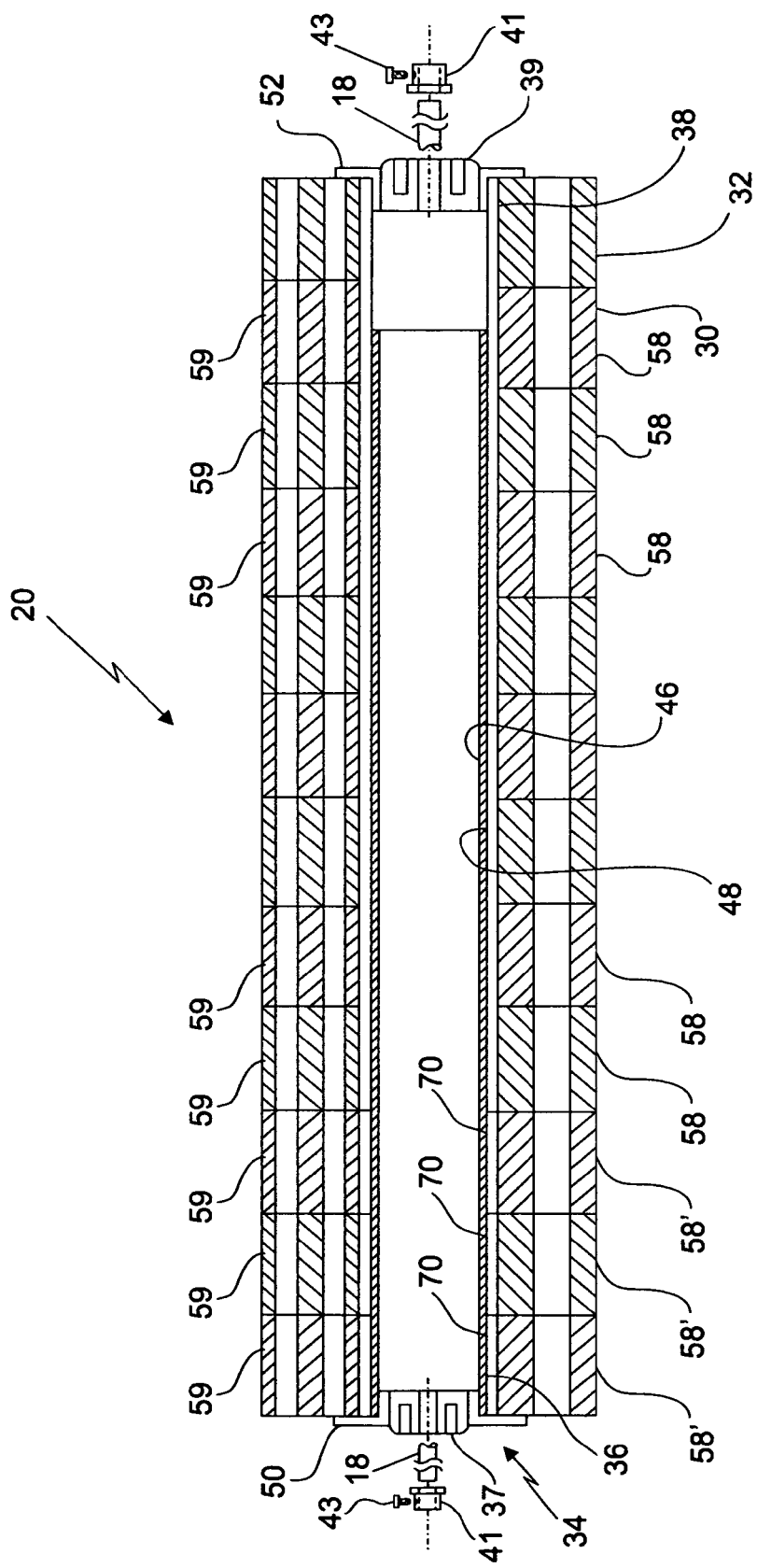
FIG. 3 is a longitudinal cross sectional view of the roller assembly of FIG. 2 and a fragment of the shaft upon which the roller assembly is positionable.

With reference to FIGS. 1-3 and 6, the roller assembly 20 includes a roller 30 which defines a cylindrical surface 32 and a central tube assembly, generally indicated 34 in FIG. 3, along which the roller 30 is positioned. The central tube assembly 34 has two opposite ends 36, 38 within which bearings 37 and 39, respectively, are positioned, and the bearings 37, 39 accept the shaft 18 which extend therethrough, and clamps 41 are used to fixedly secure the roller assembly 20 along the length of the shaft 18.

As will be described herein, the roller 30 is comprised of a number of separate roller components which enable the length of the cylindrical surface 32 of the roller 33 to be altered to accommodate the use of the roller assembly 20 on a green tire layup 24 having a width (i.e. or length as measured along the longitudinal axis of the layup 24) within a broad range of widths, and the central tube assembly 34 can be altered in length to accommodate an adjustment in length of the peripheral surface 32 of the roller 30.

Figure 6:
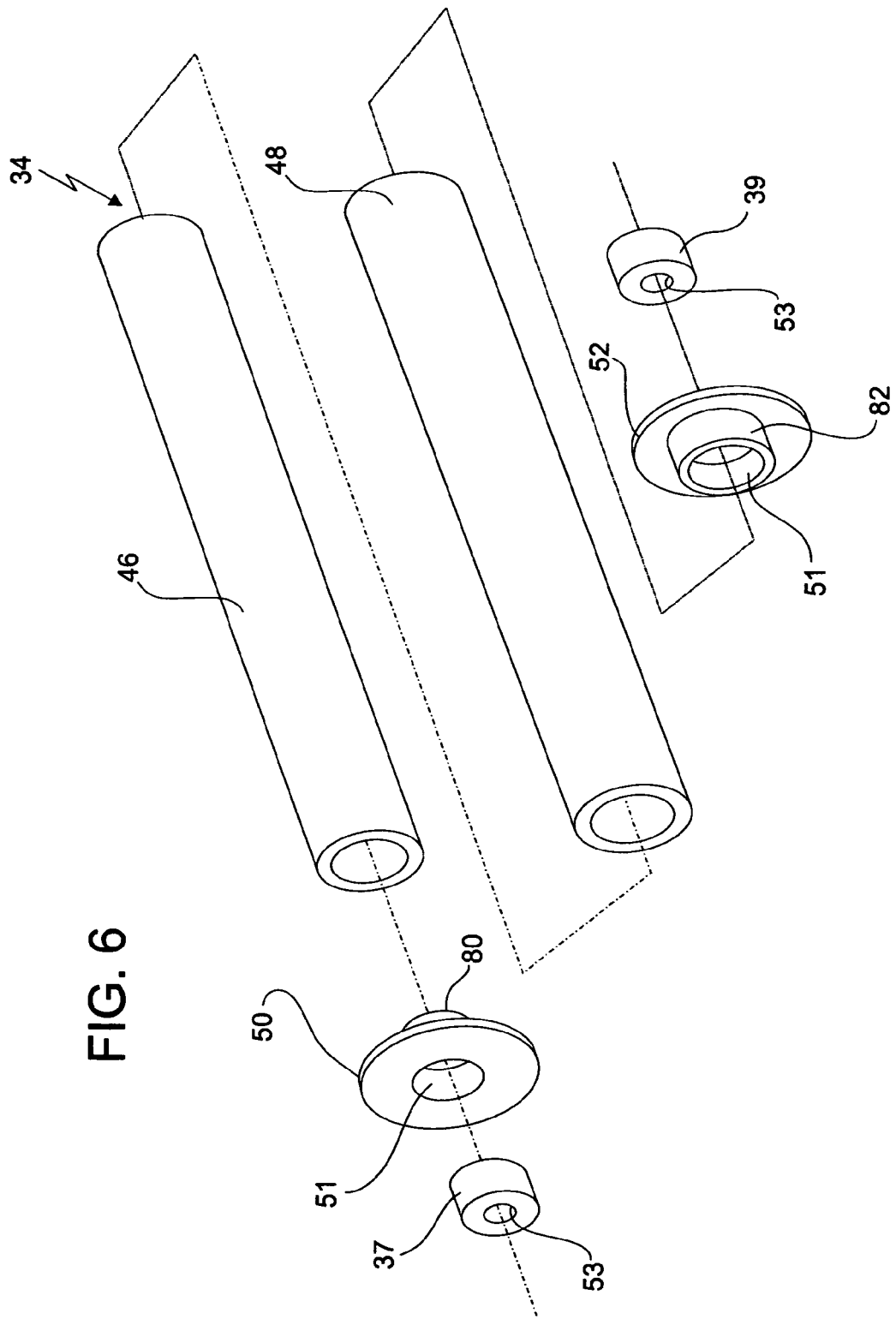
FIG. 6 is a perspective view of the tube assembly of the FIG. 1 roller assembly, shown exploded.

As best shown in FIG. 6, the central tube assembly 34 includes a pair of hollow telescoping tubes 46, 48 wherein one (i.e. an inner) tube 46 is slidably accepted by the other (i.e. an outer) tube 48. In this connection, the outer diameter of the inner tube 46 is slightly smaller than the inner diameter of the outer tube 48 to accommodate the movement of the tubes 46, 48 as they are slidably and longitudinally moved relative to one another in telescoping fashion.

Associated with the opposite ends of the central tube assembly 34 are flange members 50 and 52 with which the bearings 37, 39 are supported. In this connection, one flange member 50 has a bearing-encircling portion 80 which is fixedly secured (e.g. force-fitted) within one end of the inner tube 46 at the tube arrangement end 36, and the other flange member 52 has a bearing-encircling portion 82 which is fixedly secured (e.g. force-fitted) within one end of the outer tube 48 at the tube arrangement end 38. The flange members 50 and 52 also includes radially-extending portions which abut the corresponding end of a tube 46 or 48 when the bearing-encircling portion 80 or 82 are secured within the corresponding tube end. When collapsing the tube arrangement 46 along its length to the extent permitted by the roller components positioned thereabout, the flange members 50, 52 abut the opposite ends of the roller 30 to thereby hold the roller components closely together.

Provided within the bearing-encircling portion 80 or 82 of each flange member 50 or 52 is a central opening 51, and a bearing 37 or 39, introduced earlier, is fixedly secured within the central opening 51 of each flange member 50 or 52. Each bearing 37 or 39, in turn, defines a central through-opening 53, and it is the through-opening 53 which accepts the shaft 18 inserted therethrough. Once inserted upon the shaft 18, the clamps 41 (shown in FIG. 3) are positioned over the ends of the shaft 18 and are secured (with the set screws 43) adjacent the ends 36 and 38 of the tube arrangement 34 to fix the roller 30 in position along the length of the shaft 18.

Figure 4:
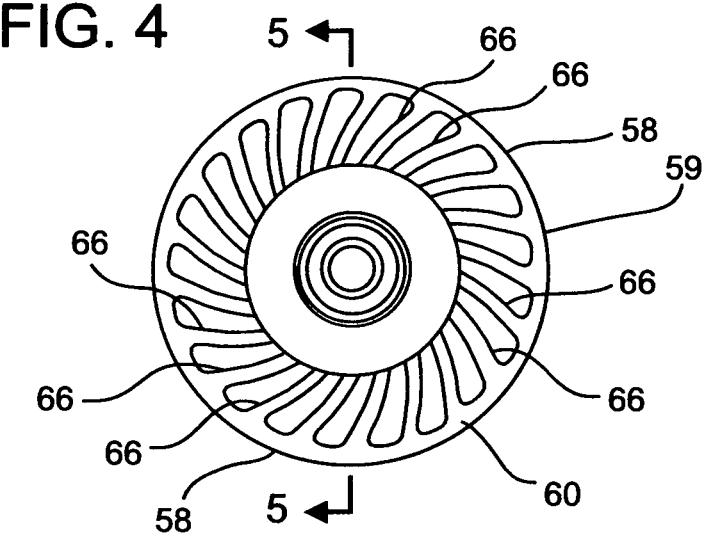
FIG. 4 is a view of a roller component of the FIG. 1 roller assembly as viewed from the left end of the FIG. 1 roller assembly.
Figure 5:
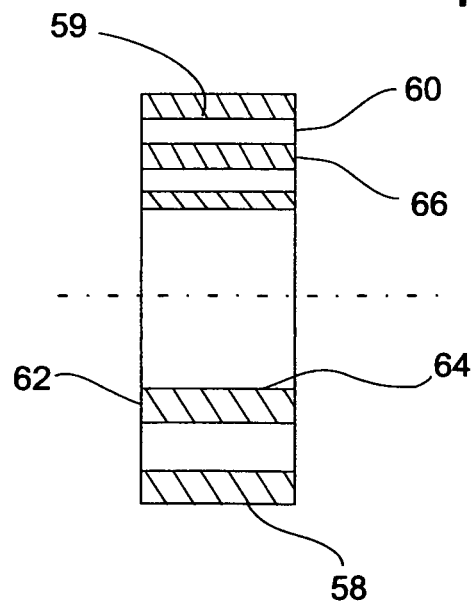
FIG. 5 is a cross-sectional view taken about along line 5-5 of FIG. 4.

With reference to FIGS. 2-5, it is a feature of the present invention that the roller 30 is comprised of a plurality of roller sections 58 (earlier referred to as roller components) which are positioned in engagement of one another along the length of the tube assembly 34 in a side-by-side relationship so that the peripheral (i.e. cylindrical) surfaces, indicated 59 in FIG. 5, of the roller sections 58 collectively provide the cylindrical surface 32 of the roller 30. As will be apparent herein, the overall length of the roller 32 can be adjusted, or altered, by adding additional roller components 58 to those already positioned along the length of the tube assembly 34 or by removing roller components 58 from the number of components 58 already positioned along the length of the tube assembly 34. Preferably, no roller section 58 of the roller 30 has a width which exceeds about two inches.

As best shown in FIG. 4, each roller component 58 includes a cylindrical ring portion 60 whose outer surface provides the peripheral surface 59 of the component 58, an inner hub portion 62 concentrically arranged within the cylindrical ring portion 60 and having a central opening 64. Extending between the hub portion 62 and the cylindrical ring portion 60 are a plurality of spoke-like members 66. Rather than extend outwardly from the hub portion 62 along a purely radially-extending path, each spoke-like member 66 is arcuate in shape (as viewed in the side view of FIG. 4) so as not to extend along a path which is directed radially outwardly along from the hub portion 62.

Each roller component 58 is constructed of a plastic material, but depending upon the desired stiffness of the roller section 58 at the peripheral surface 59 thereof, a plastic material can be selected to provide the desired stiffness of the peripheral surface 59. In other words, if the roller section 58 is desired to be very stiff at its peripheral surface 59, the component 58 can be constructed (i.e. formed) out of a plastic material which provides the peripheral surface 59 of the component 58 with the desired stiffness (i.e. durometer). Conversely, if the roller section 58 is desired to be relatively soft at its peripheral surface 59, the section 58 can be constructed (i.e. formed) out of a plastic material which provides the peripheral surface 59 of the section 58 with the desired softness (i.e. durometer).

A roller element 58 which has been found to be well-suited for use in the depicted assembly 20 when consolidating a tire carcass or for formation of a green tire layup has a Shore (durometer) hardness of between about 65 and 70 as measured on a Shore A hardness scale. It will be understood, however, that in accordance with the broader aspects of this invention, a roller element 58 for use with the roller assembly 20 may possess a Shore (durometer) hardness outside of the aforementioned range of 65 to 70.

Figure 7:
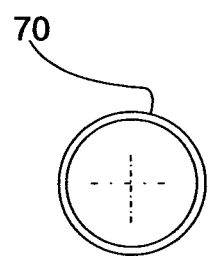
FIG. 7 is a view of a spacer tube section which is positionable within some of the roller components of the FIG. 1 roller assembly.
Figure 8:
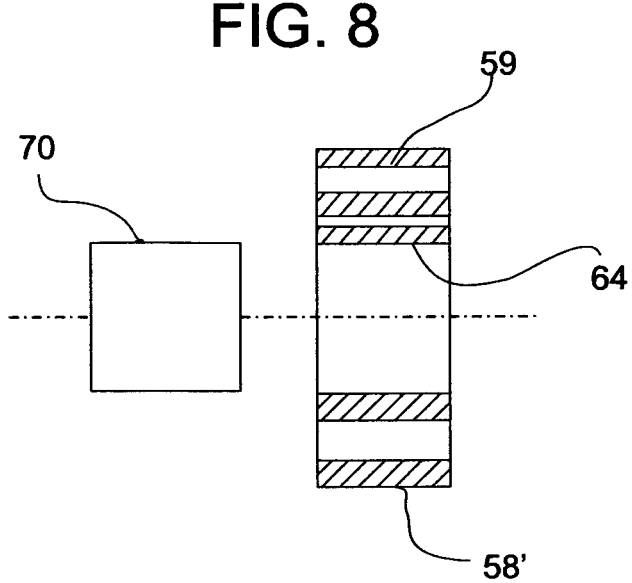
FIG. 8 is a view of a roller component and the FIG. 7 spacer tube section within which the tube section is positioned.
Figure 9:
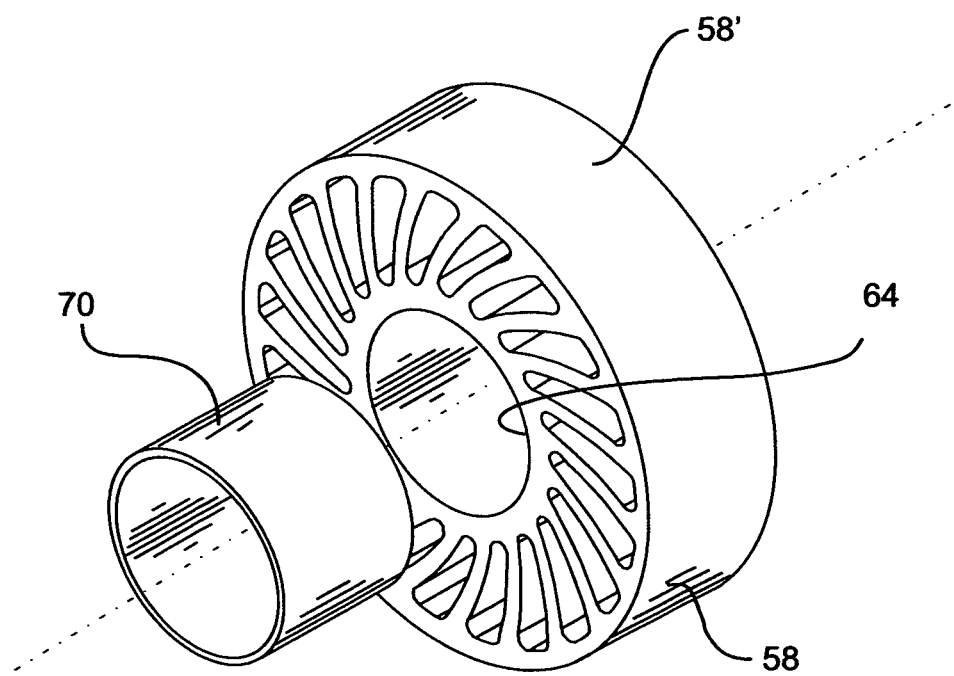
FIG. 9 is a perspective view of the roller section and spacer tube section of FIG. 8, shown before assembly.

With reference to FIGS. 7-9 and because of the differences in the outer diameters of the inner and outer tubes 46, 48 of the central tube assembly 34, it is also a feature of the roller sections 58 that each section 58 intended to be positioned about the tube 46 (i.e. those indicated 58' in FIGS. 3 and 8) has a ring-like tube section 70 which is fixedly secured (i.e. force-fitted) within the central opening 64 of the inner hub 62. The ring-like tube section 70 possesses the same outer diameter as that of the outer tube 48 and the same inner diameter as that of the outer tube 48 so that the section 70 acts as a spacer which fills any spacing which would otherwise be present between the surface of the central opening 64 and the outer surface of the inner tube 46.

It follows from the foregoing that a roller assembly 20 has been described having a telescoping central tube assembly 34 and a roller 30 which is comprised of a number of roller sections 58 arranged in a side-by-side relationship along the length of the tube assembly 34. Because the roller sections 58 are separate from one another, the number of roller sections 58 used to provide the cylindrical surface 32 of the roller 30 can be altered (i.e. either added to or removed from the length of the tube assembly 34) to thereby alter the overall length of the peripheral surface of the roller 30. Since the tubes 46, 48 of the tube assembly 34 can be slidably moved relative to one another in telescoping fashion, the overall length of the tube assembly 34 can be altered, as desired, to move the flange members 50, 52 into abutting relationship with the roller section 58 disposed at the opposite ends of the roller 30.

The roller assembly 20 also accommodates a complete change-out of the roller sections 58, as desired, to provide the cylindrical surface 32 of the roller 30 with an alternative stiffness (i.e. durometer), and permits, if desired, selected roller sections 58 to be exchanged for roller sections possessing alternative stiffnesses to provide the cylindrical surface 32 of the roller 30 with different stiffnesses along the length of the roller 30. Furthermore, the roller assembly 20 is also believed to possess a longer useful working life than is provided by the foam roller of the prior art and is further advantageous in this regard.

Figure 10:
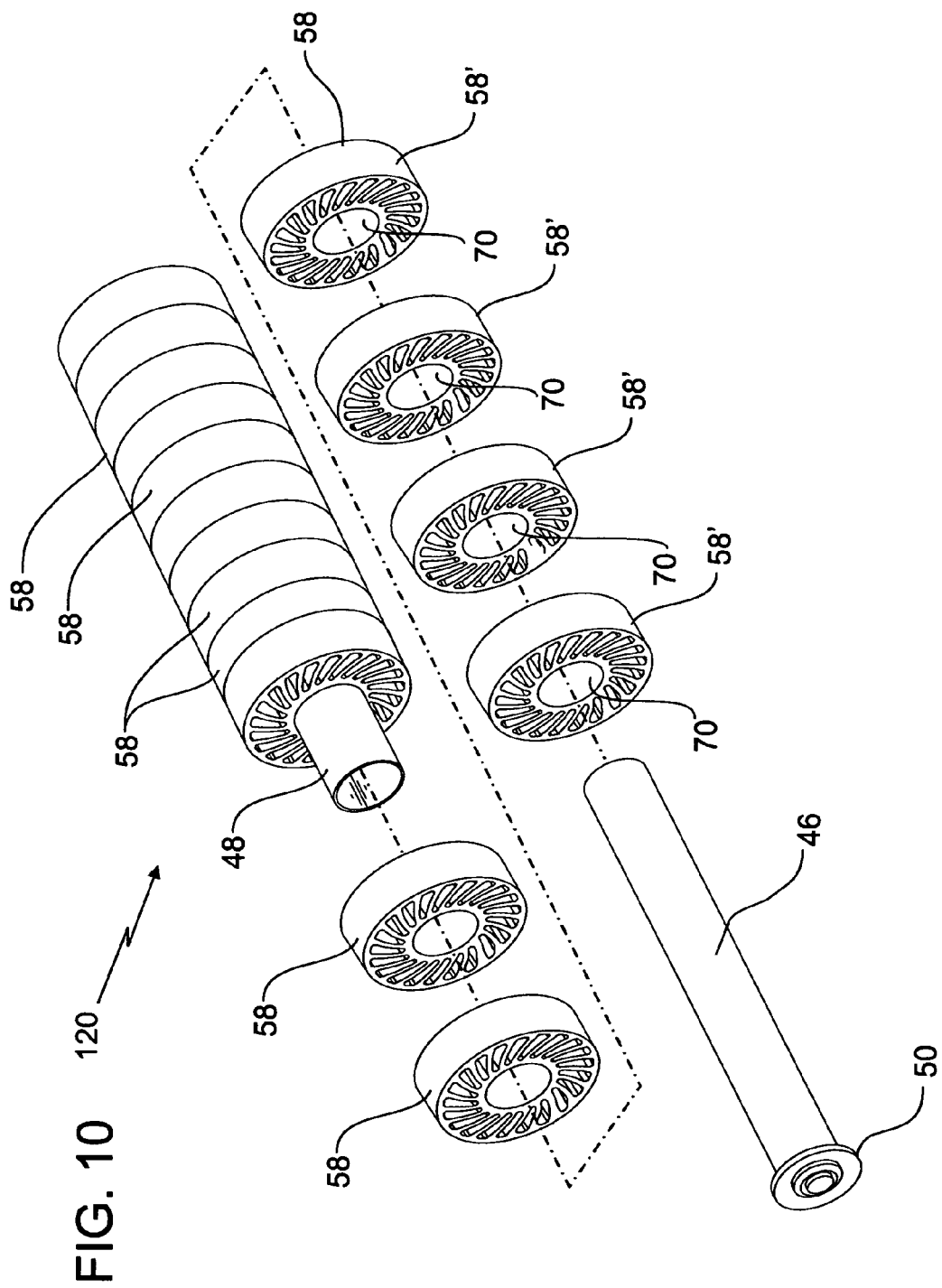
FIG. 10 is a perspective view of an alternative roller assembly within which features of the present invention are embodied.

By way of example, there is illustrated in FIG. 10 an alternative embodiment of a roller assembly, generally indicated 120, which utilizes the inner and outer tubes 46 and 48 of the embodiment 20 of FIGS. 1-3 but has a different number of roller sections 58 positioned therealong from the roller assembly 20. More specifically, the roller assembly 120 includes twelve roller sections 58 which are positioned along the length of the outer tube 48 and four roller sections 58 which each include the spacer tube section 70 fitted therein (i.e. those indicated 58' in FIG. 10) which are positioned along the length of the inner tube 46.

The exploded view of FIG. 10 also illustrates how the number of roller sections 58 (or sections 58') are added to or removed from the total number of roller sections positioned along the length of the inner and outer tubes 46 and 48. In particular, the inner and outer tubes 46 and 48 can be pulled apart and separated (by withdrawing the inner tube 46 from the outer tube 48) so that the roller sections 58 can be removed from or added to the corresponding tube 48 or 46 over the end of the tube 48 or 46 opposite the end to which a flange member (e.g. flange member 50) is attached. To thereafter return the roller assembly 120 to its assembled condition, the inner tube 46 is inserted endwise into the end of the outer tube 48 to thereby return the tubes 46 and 48 to the telescoping relationship wherein the inner tube 46 is slidably accepted by the outer tube 48. During use of the roller assembly 120, the tubes 46 and 48 are maintained in their assembled condition by the support arms (such as the support arms 17 of the tire-building machine 16 of FIG. 1) intended to support the assembly 120 adjacent a tire component under construction.

It will be understood that numerous modifications and substitutions can be had to the aforedescribed embodiment 20 without departing from the spirit of the invention. For example, although the aforedescribed embodiment 20 has been shown and described as being used for marrying a belt and tread package 28 and a tire carcass 26 to one another, the roller assembly 20 can be used to consolidate a tire carcass formed at a first stage tire-building drum upon which the tire carcass is built up. Accordingly, the aforedescribed embodiment 20 is intended for the purpose of illustration and not as limitation.

The invention claimed is:

1. A roller assembly for use during tire construction and which is positionable about a shaft which is supported along the width of a tire component under construction, the roller assembly comprising:

a telescoping tube arrangement having an outer tube section defining a cylindrical outer surface and an inner tube section, defining a cylindrical outer surface, which is positioned within the outer tube section for sliding movement therealong and which includes one portion which is positioned within the outer tube section and another portion which extends from the outer tube section and which arrangement is positionable about the shaft which is supported along the width of the tire component under construction and which can be adjusted in length to accommodate the width of the tire component under construction wherein the length of the arrangement includes the combined length of the outer tube section and the another portion of the inner tube section; and a roller having a cylindrical surface which is positionable into engagement with the outer surface of the tire component under construction and which includes a plurality of roller sections which are positionable about the cylindrical outer surfaces of the outer and inner tube sections of the telescoping tube arrangement and in a side-by-side relationship with one another, and each roller section defines a peripheral surface so that when the roller sections are positioned in a side-by-side relationship along the tube arrangement, the peripheral surfaces of the roller sections collectively provide the cylindrical surface of the roller and wherein the plurality of roller sections includes one roller section which is positioned about the outer tube section and another roller section which is positioned about the another portion of the inner tube section and wherein the one roller section includes a body having a central through-opening which is adapted to be closely accepted about the outer tube section and the another roller section includes a body having a central through-opening and further includes a ring-like tube section which is fixedly secured within the central opening of the body of the another roller section, and the ring-like tube section includes an inner diameter which is adapted to be closely accepted about the another portion of the inner tube section so that the ring-like tube section acts as a spacer which fills any spacing which would otherwise be present between the another roller section and the cylindrical outer surface of the inner tube section when the another roller section is positioned about the another portion of the inner tube section and so that the peripheral surfaces of each of the one roller section and the another roller section is stably supported by the inner and outer tube sections; and so that the one roller section and the another roller section are permitted to rotate about the cylindrical outer surfaces of the outer and inner tube sections respectively and relative to one another so that when the peripheral surfaces of the one and another roller sections are positioned in engagement with the outer surface of the tire component under construction, the one roller section and the another roller section are free to rotate about the cylindrical outer surfaces of the outer and inner tube sections respectively at speeds which are different from one another.

2. The roller assembly as defined in claim 1 wherein the roller is comprised of first and second sets of roller sections wherein each roller section of the first set defines a central through-opening which is adapted to be closely accepted by the outer tube section of the telescoping tube arrangement and each the roller section of the second set includes a respective ring-like tube section which is adapted to be closely accepted by the inner tube section of the telescoping tube arrangement.

3. The roller assembly as defined in claim 1 wherein one end of the outer tube section has a radially-extending flange associated therewith, and one end of the inner tube section has a radially-extending flange associated therewith so that after positioning the roller sections along the length of the tube arrangement, the telescoping tube arrangement can be collapsed so that the roller sections are held closely together by the flanges of the outer and inner tube sections.

4. The roller assembly as defined in claim 3 further comprising a pair of bearings wherein one of the bearings is fixedly attached to the flange associated with the outer tube section and wherein the other of the bearings is fixedly attached to the flange associated with the inner tube section.

5. The roller assembly as defined in claim 4 wherein each bearing defines a central through-opening which opens axially along the length of the tube arrangement for accepting the shaft with which the roller assembly is supported adjacent the outer surface of the tire component under construction.

6. The roller assembly as defined in claim 1 wherein each roller section is constructed of a pliant material which provides its peripheral surface with a respective predetermined stiffness.

7. The roller assembly as defined in claim 1 wherein each roller section has a width which is no more than about two inches.

8. The roller assembly as defined in claim 1 wherein each roller section has an outer ring section which defines its peripheral surface, an inner hub section through which is provided a central-through opening of a body of the roller section in question, and a plurality of spoke-like members which extend between the inner hub section of the roller section in question and the outer ring section of the roller section in question.

9. The roller assembly as defined in claim 8, wherein each of the spoke-like members extends along a path which is not purely radial with respect to the roller section of the spoke-like member in question.

10. The roller assembly as defined in claim 1 wherein the peripheral surface of the one roller section possesses a predetermined stiffness and the peripheral surface of the another roller section possesses a stiffness which is different than the predetermined stiffness.

11. A roller assembly for consolidating a tire carcass during a tire-building process or to marry a belt and tread package to the tire carcass during a tire-building process, the roller assembly comprising:

a telescoping tube arrangement having an outer tube section defining a cylindrical outer surface and an inner tube section, defining a cylindrical outer surface, which is positioned within the outer tube section for sliding movement therealong and which includes one portion which is positioned within the outer tube section and another portion which extends from the outer tube section and a roller positioned about the telescoping tube arrangement and having a cylindrical surface for engaging the outer surface of the tire carcass or belt and tread package in order to consolidate the tire carcass or to marry the belt and tread package to the tire carcass, the roller including a plurality of roller sections which are positionable about the cylindrical outer surfaces of the outer and inner tube sections and in a side-by-side relationship along the length of the tube arrangement so that by adding roller sections along the length of the tube arrangement, wherein the length of the arrangement includes the combined length of the outer tube section and the another portion of the inner tube section, or by removing roller sections from the length of the tube arrangement, the length of the roller can be altered to accommodate the width of the tire carcass or the belt and tread package being engaged, and each roller section defines a peripheral surface so that when the roller sections are positioned in the side-by-side relationship along the tube arrangement, the peripheral surfaces of the roller sections collectively provide the cylindrical surface of the roller and wherein the plurality of roller sections includes one roller section which is positioned about the outer tube section and another roller section which is positioned about the another portion of the inner tube section and wherein the one roller section includes a body having a central through-opening which is adapted to be closely accepted about the outer tube section and the another roller section includes a body having a central through-opening and further includes a ring-like tube section which is fixedly secured within the central opening of the body of the another roller section, and the ring-like tube section includes an inner diameter which is adapted to be closely accepted about the inner tube section so that the ring-like tube section acts as a spacer which fills any spacing which would otherwise be present between the another roller section and the cylindrical outer surface of the inner tube section when the another roller section is positioned about the another portion of the inner tube section and so that the peripheral surfaces of each of the one roller section and the another roller section is stably supported by the inner and outer tube sections; and so that the one roller section and the another roller section are permitted to rotate about the cylindrical outer surfaces of the outer and inner tube sections respectively and relative to one another so that when the peripheral surfaces of the one and another roller sections are positioned in engagement with the outer surface of the tire carcass or the belt and tread package, the one roller section and the another roller section are free to rotate about the cylindrical outer surfaces of the outer and inner tube sections respectively at speeds which are different from one another.

12. The roller assembly as defined in claim 11 wherein the roller is comprised of first and second sets of roller sections wherein each roller section of the first set defines a central through-opening which is adapted to be closely accepted by the outer tube section of the telescoping tube arrangement, and each the roller section of the second set includes a respective ring-like tube section which is adapted to be closely accepted by the inner tube section of the telescoping tube arrangement.

13. The roller assembly as defined in claim 12 wherein one end of the outer tube section has a radially-extending flange associated therewith, and one end of the inner tube section has a radially-extending flange associated therewith so that after positioning the roller sections along the length of the tube arrangement, the telescoping tube arrangement can be collapsed so that the roller sections are held closely together by the flanges of the outer and inner tube sections.

14. The roller assembly as defined in claim 13 further comprising a pair of bearings wherein one of the bearings is fixedly attached to the flange associated with the outer tube section and wherein the other of the bearings is fixedly attached to the flange associated with the inner tube section.

15. The roller assembly as defined in claim 14 wherein each bearing defines a central through-opening which opens axially along the length of the tube arrangement for accepting a shaft with which the roller assembly is supported adjacent the outer surface of the tire carcass or the belt and tread package.

16. The roller assembly as defined in claim 11 wherein each roller section is constructed of a pliant material which provides its peripheral surface with a respective predetermined stiffness.

17. The roller assembly as defined in claim 11 wherein each roller section has an outer ring section which defines its peripheral surface, an inner hub section through which is provided a central-through opening of a body of the roller section in question, and a plurality of spoke-like members which extend between the inner hub section of the roller section in question and the outer ring section of the roller section in question.

18. The roller assembly as defined in claim 17, wherein each of the spoke-like members extends along a path which is not purely radial with respect to the roller section of the spoke-like member in question.

19. The roller assembly as defined in claim 11 wherein the peripheral surface of the one roller section possesses a predetermined stiffness and the peripheral surface of the another roller section possesses a stiffness which is different than the predetermined stiffness.

20. A roller assembly for consolidating a tire carcass during a tire-building process or to marry a belt and tread package to the tire carcass as the tire carcass or belt and tread package is rotated about an axis, the roller assembly comprising:

a telescoping tube arrangement which is supportable for rotation about its longitudinal axis and adjacent the tire carcass and having an outer tube section defining a cylindrical outer surface and an inner tube section, defining a cylindrical outer surface, which is positioned within the outer tube section for sliding movement therealong and which includes one portion which is positioned within the outer tube section and another portion which extends from the outer tube section, and a roller positioned about the telescoping tube arrangement and having a cylindrical surface for rollably engaging the outer surface of the tire carcass or belt and tread package in order to consolidate the tire carcass or to marry the belt and tread package to the tire carcass, the roller including a plurality of roller sections which are positionable about the tube arrangement and in a side-by-side relationship along the length of the tube arrangement wherein the length of the tube arrangement includes the combined length of the outer tube section and the another portion of the inner tube section and wherein each roller section possesses a respective predetermined hardness so that the cylindrical surface of the roller engages the outer surface of the tire carcass or belt and tread package with a desired stiffness profile, and each roller section defines a peripheral surface so that when the roller sections are positioned in the side-by-side relationship along the tube arrangement, the peripheral surfaces of the roller sections collectively provide the cylindrical surface of the roller and wherein the plurality of roller sections includes one roller section which is positioned about the outer tube section and another roller section which is positioned about the another portion of the inner tube section and wherein the one roller section includes a body having a central through-opening which is adapted to be closely accepted about the outer tube section and the another roller section includes a body having a central through-opening and further includes a ring-like tube section which is fixedly secured within the central opening of the body of the another roller section, and the ring-like tube section includes an inner diameter which is adapted to be closely accepted about the inner tube section so that the ring-like tube section acts as a spacer which fills any spacing which would otherwise be present between the another roller section and the cylindrical outer surface of the inner tube section when the another roller section is positioned about the another portion of the inner tube section and so that the peripheral surfaces of each of the one roller section and the another roller section is stably supported by the inner and outer tube sections; and so that the one roller section and the another roller section are permitted to rotate about the cylindrical outer surfaces of the outer and inner tube sections respectively and relative to one another so that when the peripheral surfaces of the one and another roller sections are positioned in engagement with the outer surface of the tire carcass or the belt and tread package, the one roller section and the another roller section are free to rotate about the cylindrical outer surfaces of the outer and inner tube sections respectively at speeds which are different from one another.

\* \* \* \* \*